UNITED STATES PATENT OFFICE.

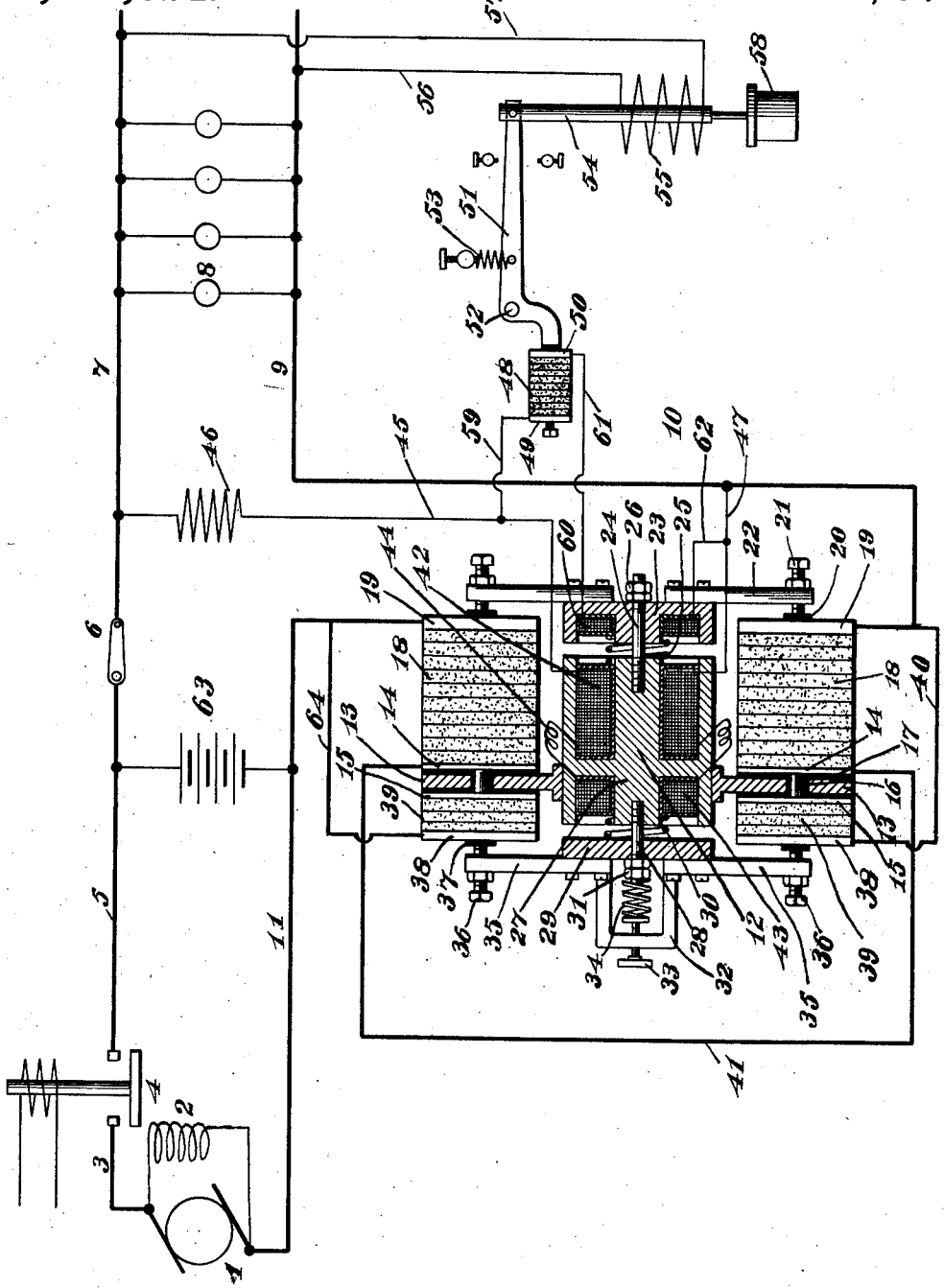

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,248,624.      Specification of Letters Patent.      Patented Dec. 4, 1917.

Application filed January 15, 1910. Serial No. 538,203.

*To all whom it may concern:*

Be it known that I, JOHN L. CREVELING, a resident of New York, in the county and State of New York, have invented certain new and useful Improvements in Electric Regulations, as set forth in the annexed specification and drawing forming a part thereof.

My invention pertains to that class of electric regulation wherein it is desired to regulate an electric circuit in a desired manner throughout wide ranges and particularly to that class wherein such regulation is to be accomplished automatically.

My invention has for its particular object to provide means whereby the voltage across an electric circuit or the current flowing therein may be regulated in a desired manner throughout a wide range as, for example, to hold the voltage upon a translation circuit constant throughout wide variation in voltage at the source of current supply.

As my invention is particularly applicable to systems wherein a generator is used to supply current to a storage battery and lamps or translating devices in circuit therewith, it will be described in connection with such a system as performing the function of holding constant voltage upon the translation circuit throughout changes in voltage across the generator circuit.

The drawing is a diagrammatic representation of one type of system embodying the elements of my invention.

In the drawing 1 represents a dynamo or generator provided with the usual field coil 2. 3 represents the positive lead of the generator which is carried to one side of the switch 4 which may be of the automatic variety adapted to open and close the circuit when the voltage of the generator reaches proper predetermined limits. From the other terminal of the switch 4 the main 5 is led to the storage battery 63 and to one side of the switch 6 governing the translation circuit. The other side of the switch 6 is connected to the main 7 which is in communication with one side of the lamps or translation devices 8, the other side of which is connected with the main 9 which is carried to the regulator 10 from which return is made to the generator 1 as by lead 11 which is connected also to the negative side of the storage battery 63. The regulator 10 comprises a central magnet frame 12 to which is attached the projecting members 13 which carry the conducting members 14 and 15 on opposite sides thereof and which are united as by means of screw 16 and insulated from the members 13 as by insulating members 17. Piles of contacting electrodes as, for example, a series of carbon disks 18 are held by any suitable means (not shown) in the positions indicated so as to be allowed to come in contact with the members 14. The conducting members 19 rest against the contacting electrodes 18 and are carried by the insulating bushings 20 carried by the screws 21 which in turn are carried by the arms or members 22. The members 22 are attached to the armature 23 which is made of magnetic material and carried by the non-magnetic rod 24 in such manner as to be free to move thereupon and normally pressed outwardly away from the magnet 12 as by the spring 25, the limit of such outward movement being fixed by the nuts 26. The magnet 12 is provided with an extension 27 as indicated into which is threaded the rod 28 of non-magnetic material carrying the armature 29 in such manner as to be free to slide upon the same. The spring 30 normally tends to press the armature 29 away from the magnet and its limit of travel may be set by the nuts 31. 32 represents a yoke attached to the armature 29 and provided with a screw 33 by means of which the spring 34 may be compressed against the nuts 31 in such manner that the compression of said spring tends to move the armature 29 away from the magnet 27. The armature 29 carries the arms 35 provided with the screws 36 engaging the insulating bushings 37 which carry the conducting members 38. 39 represents a small number of contacting electrodes held between the members 38 and the conducting members 15. The lower member 38 is connected with the main 9 as by the wire 40 and the upper member 38 is connected with the lead 11 as by the wire 64 and the members 14 are connected as by means of wire 41. The magnet portion 12 is provided with the winding 42 and the extended portion 27 is provided with the winding 43 which may be in series with the winding 42 as by means of conductors 44. The wire 45 connects one end of the winding 42 with the main 7 through the resistance 46 and the wire 47 connects the other end of the winding 42 with the main 9. 48 represents a variable resistance as, for example, a pile of carbon disks or electrodes, the position of which may be adjusted as by means of the adjustable member 49 in contact with the said electrodes. The opposite end of the pile of electrodes 48 is in contact with the member 50 carried by the lever 51 pivotally mounted as at 52 and normally drawn in an upward direction as by the adjustable spring 53. The lever 51 is provided with the core 54 of magnetic material which is surrounded by the winding 55 in shunt across the mains 9 and 7 as by means of wires 56 and 57 respectively. 58 represents a dash-pot resisting too sudden movement of the core 54. The member 49 is connected with the wire 45 as by means of the wire 59. The member 50 is connected as by means of the wire 61 with the winding 60 carried by the armature 23 and having its other terminal connected with the wire 47 as by means of wire 62; thus it will be plain that the resistance 48 and the winding 60 are in series with each other and in shunt across the windings 42 and 43. The winding 60 is so arranged that the current flowing therein will oppose the action of the current in the winding 42 for a purpose which will hereinafter plainly appear.

The operation of my improvement in electric regulation is substantially as follows:

If the generator be considered as at rest or as operating the voltage too low to cause the main switch 4 to close, current will be supplied by the battery 63 to the lamps or translating devices through switch 6 and main 7 and return from the translating devices 8 through main 9, regulator 10 and lead 11 to the battery. The current flowing through the regulator 10 may be considered as entering the lower conducting member 19 and then passing through the electrodes 18 to the conducting member 14 to wire 41, then to the upper member 14 and through the contacting electrodes 18 to the upper member 19 and then to the lead 11. A portion of the current may also flow from the main 9 through wire 40 to the lower member 38, then through the lower electrodes 39 to the member 15, then through the screw 16 to the plate 14, then through wire 41 to the upper member 14 through the upper member 16 to the plate 15, then through the upper carbons 39 to the member 38 and then from wire 64 to the lead 11. In other words, the carbons 39 may be made to shunt part of the current around the carbons 18 under predetermined conditions as will hereinafter be brought out. Current will also flow from the lead 7 through the resistance 46 and wire 45 to the windings 42 and 43 and then through the wire 47 to the lead 9. This will energize the magnets 12 and 27 so as to tend to attract the armature 23 and compress the disks 18 and attract the armature 29 and compress the disks 39 so that both sets of disks will reduce the total resistance of the regulator 10. Some current will also flow through the wire 57 to the coil 55 and return to the lead 9 through the wire 56. This current will be a function of the voltage impressed upon the translating devices and if this be the desired voltage to be held constant as, for example, the normal discharge voltage of the batteries, I so set the adjustable spring 53 that the lever 51 will be raised into such position that the resistance 48 is comparatively very high, then very little current will flow through the wire 59, resistance 48, wire 61, winding 60 and wire 62 and thus little, if any, current will be shunted away from the windings 42 and 43 and the weakening effect of the coil 60 will be very small. Under these conditions the disks 18 will be tightly compressed but as these are made considerable in number in order to obtain a wide range of increasing resistance there would still be considerable resistance in circuit if these alone remained in series with the mains. However, as it is now desired that the resistance of the regulator shall be very low I so set the spring 34 that the magnet 27 will move the armature 29 and compress the carbons 39 in such manner as to form a shunt of low resistance around the carbons 18. As it is desired that the resistance of the piles 39 shall be low I use only a few disks in these and the resistance of the piles 39 may be greatly reduced by a slight pressure being exerted thereupon. If now the generator be started and brought up to such voltage that the main switch 4 shall close and some current shall be supplied to line, the voltage across the batteries will rise and the voltage across the translating devices will also tend to rise. This will cause the current in the coil 55 to increase and depress the lever 51 so as to compress the contacting members 48 and lower the resistance thereof. A very slight increase in pressure upon these electrodes 48 will greatly reduce their resistance and cause quite an appreciable increase in current through the wire 59, resistance 48, wire 61, winding 60 and wire 62. This, by shunting the current away from the windings 42 and 43, will weaken the same and the spring 34 will cause a considerable change in resistance of the piles 39, and I preferably arrange these in such manner that their total resistance is inserted by a reasonably small fall in magneto-motive force of the coil 43. If then their resistance be sufficiently raised the piles 18 may be considered as alone in series with the translation circuit and if now the voltage across the translation circuit shall rise still further as, for example, when the speed of the generator is raised and more current supplied thereby, the action of the coil 55 will be to further depress the lever 51 and reduce the resistance 48 and weaken the current in the winding 42 so as to decrease the pressure upon the disks 18 and increase the resistance in the translation circuit to compensate for the said rise in voltage. The weakening effect of the current in the winding 42, by the action of the resistance 48, is also increased by the current shunted away from the winding 42 which passes through the winding 60 in such direction that the magneto-motive force set up thereby opposes the magneto-motive force of the coil 42. A further increase in voltage across the mains will cause the above outlined operation to continue in such manner as to hold the voltage across the translation devices substantially constant throughout a wide increase across the mains. If now the generator shall slow down so that the voltage across the mains shall fall, the current in the coil 55 will weaken and the spring 53 will raise the lever 51 so as to decrease the pressure upon the members 48 and increase the resistance thereof. This will increase the current in the coil 42 and decrease the current in the coil 60 and thus cause the armature 23 to have a stronger pressure exerted thereby so as to compress the carbons 18 and reduce the resistance thereof to compensate for the said drop in voltage. This operation will continue until the pressure upon the disks 18 has been increased to about the maximum desired to have exerted thereupon and then a further decrease in voltage will cause the current in the coil 43 to so increase that the action of the spring 34 will be overcome and pressure will be exerted upon the members 39 so as to shunt a portion of the current around the members 18. If now there be a still further drop in voltage more pressure will be exerted upon the members 39 and these being of quite low resistance will practically shunt out the members 18 and the drop across the regulator 10 may be reduced to practically nil.

From the foregoing it will be seen that I have produced a regulator in which the members 39 may be used to reduce the total resistance to a minimum and a large number of the members 18 may be used to extend the increase of resistance over a wide range. In other words, the two sets of contacting electrodes 18 and 39 are operated together in such manner as to form a regulator having an extremely wide range which is automatically controlled by a delicate mechanism varying the resistance of the member 48. It will, therefore, be obvious that with this arrangement a constant voltage may be held within very narrow limits upon the translation circuit throughout wide changes in voltage across the generator and throughout wide changes in load upon the circuit. If it be desired that the current in the translation circuit shall be held constant instead of the voltage across the same, the coil 15 may be replaced by a coil in series with the translation circuit as will be obvious to one skilled in the art.

I do not wish in any way to limit myself to the exact construction or any of the details shown in the drawing as the same is a mere diagrammatic representation of one form of device or system comprehending my invention and it will be obvious that wide departures in construction may be made without departing from the spirit thereof.

Having thus described my invention that which I consider as novel and desire to protect by Letters Patent is as set forth in the following claims:

1 In an apparatus of the class described, in combination, a plurality of pressure controlled variable resistance elements in electrical operative relation to one another, a plurality of armatures acting upon said variable resistance elements, electro-magnetic means comprising a plurality of windings associated with said armatures to vary the pressure exerted upon said resistance elements, electro-magnetic means mounted upon one of said armatures and additional electro-magnetic means including a variable resistance for affecting conjointly said electro-magnetic means to cause said resistance elements to become operative successively and to supplant one another.

2. In an apparatus of the class described, in combination, a plurality of pressure controlled variable resistance elements in electrical operative relation to one another, a plurality of armatures acting upon said variable resistance elements, electro-magnetic means comprising a plurality of windings associated with said armatures to vary the pressure exerted upon said resistance elements, electro-magnetic means mounted upon one of said armatures and additional electro-magnetic means for simultaneously increasing the effect of said last mentioned electro-magnetic means and decreasing the effect of said plurality of electro-magnetic means to cause said resistance elements to become operative successively and to supplant one another.

3. Means for regulating an electric circuit comprehending a plurality of regulating means in operative relation to each other; electromagnetic means comprising a plurality of windings in circuit with each other for controlling said regulating means and causing them to operate successively and one to supplement the other; combined with automatic means for regulating the current in said electromagnetic means to affect both regulating means, said automatic means including a variable resistance medium.

JOHN L. CREVELING.

Witnesses:
M. HERSKOVITZ,
E. HALL.